Feb. 11, 1969  W. J. HARTIN  3,427,452
THERMOLUMINESCENT HEAT STABLE LITHIUM FLUORIDE DOSIMETER
Filed Aug. 31, 1966
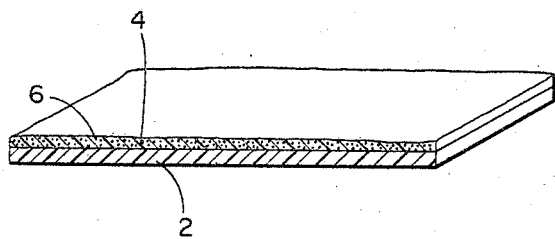
INVENTOR.
WILLIAM J. HARTIN
BY

United States Patent Office 3,427,452
Patented Feb. 11, 1969

3,427,452
THERMOLUMINESCENT HEAT STABLE LITHIUM
FLUORIDE DOSIMETER
William J. Hartin, Wading River, N.Y., assignor to the
United States of America as represented by the United
States Atomic Energy Commission
Filed Aug. 31, 1966, Ser. No. 576,781
U.S. Cl. 250—71         2 Claims
Int. Cl. H01j 1/62; G01n 21/38; C09k 1/00

ABSTRACT OF THE DISCLOSURE

A radiation dosimeter having improved linear response at low levels of radiation comprised of a substrate of a heat stable polyimide-acid plastic having a layer of granular dosimetric lithium fluoride bonded to the surface of the substrate with a thin binder coating of the polyimide-acid plastic.

---

The invention described herein was made in the course of, or under a contract with the U.S. Atomic Energy Commission.

State of the prior art

One radiation dose recording principle is based on the ability of some materials to absorb and retain an amount of energy proportional to a radiation dose. Upon heating, these materials re-emit this energy in the form of light which can be measured with available instruments. These materials are called thermoluminescent materials.

A preferred dosimetric material is lithium fluoride, having impurities of about .1% magnesium, on the order of .01% calcium and traces of aluminum, iron, titanium and silicon. Such materials are readily available commercially. Hereinafter the term "dosimetric lithium fluoride" shall be used to denote lithium fluoride having induced crystal imperfections to enhance its thermoluminescence and improve the linearity of the radiation dose dependence in the dose range $0$–$10^5$ r R. of gamma radiation.

In spite of the advantages of dosimetric lithium fluoride, the film badge, relying on radiation sensitive photographic emulsions, is still the universally used badge means of monitoring radiation exposure of personnel, although the film badge is not accurate and requires much labor in evaluation. This is mainly due to the fact that there has never been a compact thermoluminescent dosimeter which can be evaluated without the use of a comparative method or otherwise by complicated apparatus requiring at least the same amount of handling and processing labor.

U.S. Patent No. 3,243,590 issued to A. H. Farman, J. R. Gaskill, W. A. Phillips and R. D. Taylor on Mar. 29, 1966, discloses a radiation dosimeter wherein a layer of dosimetric lithium fluoride is bound to a substrate of graphite cloth with potassium silicated. The lithium fluoride deposit in this device is in the form of small dosimetric lithium fluoride crystals dispersed in a matrix of solidified potassium silicate which bonds together the individual fluoride crystals and the ceramic strip. The device disclosed in this dosimeter has several drawbacks when one desires to achieve direct readings of low energy radiation. These difficulties are due mainly to the use of potassium silicate as a binder material, such such a binder is a relatively high "Z" material which introduces errors when the dosimeter is exposed to low energy radiation.

Brief description of the drawing

The figure shows a film with partial cross section which can be used as a dosimeter in accordance with the practice of this invention.

Description of the invention

I have discovered a thermoluminescent radiation dosimeter as shown in the figure having an improved linear response comprising a substrate 2 composed of a polyimide-acid plastic stable to heating to at leas about 400° C., dosimeter granular lithium fluoride 4 being distributed on at least a portion of the surface of said substrate, and a binder coating 6 of said polyimide-acid plastic bonding the lithium fluoride granules to said substrate.

By the term polyimide plastics as used in this application, I mean those plastics disclosed in U.S. Patent No. 3,179,634 issued to Walter M. Edwards on Apr. 20, 1965. These are polyimides having a recurring unit

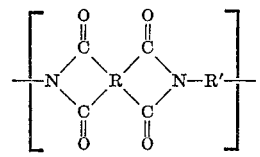

wherein R is a tetravalent radical containing at least one ring of six carbon atoms, said ring characterized by benzoid unsaturation, the four carbonyl groups being attached directly to separate carbon atoms in a ring of the R radical and each pair of carbonyl groups being attached to adjacent carbon atoms in a ring of the R radical; and wherein R′ is a divalent benzenoid radical selected from the group consisting of:

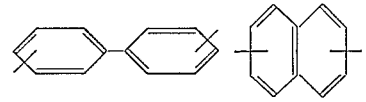

Other polymers containing sulfur, phosphorus and silica are disclosed in U.S. Patent No. 3,179,634, however, I do not deem it advisable to employ such polymers since U.S. Patent No. 3,179,614 issued to Walter M. Edwards these materials are relatively high "Z" materials.

on Apr. 29, 1965, discloses and claims the monomers and method of preparing the monomers which are utilized in forming the polymers disclosed in the U.S. Patent 3,179,-634. Both of these patents fully disclose methods of preparing the polyimide substrates and also the binders found useful in my invention.

In essence my invention consists in preparing a coating mixture for the surface of a polyimide-acid plastic composed of a mixture of granular dosimetric lithium fluoride, a monomer selected from those disclosed in U.S. Patent No. 3,176,614 containing low "Z" materials, a solvent such as dimethyl formamide applying a thin layer of the coating mixture to the substrate, and heating the coated substrate to evaporate the solvent and polymerize the monomer, thus causing the dosimetric lithium fluoride to be bound to the substrate. The lithium fluoride so bound to the substrate also has a thin layer of polymer entirely enveloping it and protecting the lithium fluoride from chemical contamination.

In a preferred embodiment of my invention, a base coat containing graphite in place of the lithium fluoride is first spread on the surface of the substrate to render the substrate impervious to light. In the base coat fine particles of graphite are employed to provide a smooth coating. The base coat is a mixture of the monomer, graphite and solvent, which is heated to evaporate off the solvent and polymerize the monomer.

The coatings found useful in my invention can be applied to the substrate by an conventional technique such as, painting, rolling, spraying, etc.

The amount of lithium fluoride to be utilized in preparing the dosimeters of my invention can vary grately, but in general, I have found that the use of about 300 mg. in a personnel monitoring badge is sufficient, and this is spread out in a film, having a film thickness of about 5 mils. Thicker films may be employed but they require longer times for readout due to slower heating.

The ratio of lithium fluoride to monomer contained in the coating mixture can vary widely, but in general, to ensure accuracy, only sufficient monomer should be present to encapsulate and bind the lithium fluoride to the substrate. The amount of solvent to be employed in the coating mixture is of course to some degree dependent on the coating technique to be employed, but since all solvent is evaporated from the system this is not critical.

In the preferred embodiment of my invention the substrate is in the form of a thin film which when coated can be inserted in conventional badge receptacles. My dosimeters in effect provide the art with a package of lithium fluoride in a readily useable form. The packaging material can be heated for protracted periods to 400° C., it is relatively impervious to radiation damage and to chemical attack. Obviously it is useful and can be incorporated directly into a wide variety of systems where such a dosimeter would be useful.

EXAMPLE

In this example, a polyimide-acid plastic film having a thickness of 5 mils and an area of 2 sq. inches. The film was made of a monomer disclosed in U.S. Patent 3,179,614, and the monomer contained 22 carbon atoms, 10 hydrogen atoms, 5 oxygen atoms and 2 nitrogen atoms. The monomer was polymerized in accordance with the method shown in U.S. Patent 3,179,634 until a polymer having a molecular weight of over 350,000 was formed. The plastic film used in this example is commercially available and is sold by the Dupont Chemical Corporation, Wilmington, Del., under the registered trademark of "Kapton."

A coating mixture containing equal volumes of finely powdered graphite, toluene and a prepared monomer mixture containing 2 parts by volume of the monomer used to form the polymer film above and one part dimethylformamide. This mixture was stirred until a smooth mixture was obtained. The mixture was then painted onto the surface of the polymer film until the entire surface of the film was obscured by the mixture. The film was baked for 40 minutes at a temperature of 150° C. and then baked for one hour at a temperature of 350° C.

The baked coated film was then cut into sections of approximately 1½ inches by 1¼ inches and a 3 mil thick layer of the prepared monomer mixture was painted on the sections and the painted sections were allowed to stand for five minutes in order to become tacky. Up to about 300 mg. of granular dosimetric lithium fluoride was sprinkled on each section and the excess was shaken off. The sections were baked at 150° C. for thirty minutes and a thin layer of the prepared monomer mixture was painted over the lithium fluoride coated sections. The sections were then cooked for thirty minutes at 150° C. and allowed to cool to room temperature. Thereafter the sections were cooked for one hour at 350° C. and allowed to cool to room temperature. The finished dosimeters had the appearance of rough sandpaper.

Adequate ventilation was provided during the heating steps to avoid having the vaporous materials deposit in the surface of the film and cause darkening of the dosimeters.

The graphite and binder coating on the finished dosimeter was approximately 1.5 mils thick. The lithium fluoride and binder coating on the finished dosimeter was approximately 15 mils thick.

Once the dosimeters have been made, they can be treated as packages of dosimetric lithium fluoride, so normal practices of irradiation and annealing may be applied.

The flat plastic dosimeters free one from many of the limitations imposed by use of powder. In the reader employed in this example, the photomultiplier tube viewed a constant temperature source, which kept the dark current constant, and therefore much easier to balance out. It is possible to keep the temperature just a few degrees above the dosimeter readout temperature, thus avoiding difficulty with tribothermoluminescence, which causes trouble at low dose levels in most readout systems.

The dosimeters prepared in this example were tough, flexible, reusable dosimeters having the linear energy response characteristics of dosimetric lithium fluoride. They were readily adapted for use in automatic dosimeter readout and identification devices.

A brass heater block 1.75" x 1.75" x 3", was employed which contained heating elements and the temperature controller. A thermocouple was placed in the block, close to the lower surface, so that the temperature was monitored continuously. The brass block was mounted so that it was self-levelling, and sat firmly on the glass; thus the glass tended to rise to the temperature of the heater block. A small fan sucked room air through the lower part of the reader containing the light pipe and photomultiplier tube assembly. A small amount of air was permitted to enter the top of the reader and flow past the block to the exit in the lower part of the reader; this acted as a heat sink for the glass and assured that the glass temperature was a little below that of the lower surface of the heater block.

When a dosimeter was to be read, it was placed in the slide, which was then inserted in the reader. As it approached the heater block, two cams pressed upward on the pivot arms and the brass block was raised about a quarter of an inch. When the dosimeter was in position over the glass, the carriage on which it rode was stopped by limit pins, and the brass block came down. The block weighed approximately two pounds, so it pressed quite firmly on the dosimeter, thus assuring good thermal contact and repeatable heat transfer.

The heater block was kept a few degrees above the dosimeter readout temperature; since it had practically infinite mass as compared to the dosimeters and since it had high conductivity, it acted as a constant temperature source. This block was easily maintained within 1 or 2 degrees of the desired temperature. The upper surface of the glass was slightly above the dosimeter readout temperature, but the conductivity of the glass was much lower than that of brass. Thus, when the dosimeter touched the glass surface, the temperature of the surface dropped below readout (since the dosimeter was ordinarily near room temperature initially) and the heat which causes readout comes mainly from the brass block.

The photomultiplier tube is an EMI 9502S which gave high gain levels, but has very low dark current partly because the photocathode is only about a centimeter square. Since the photocathode is small, the light coming through the glass block was reduced to a beam less than a centimeter across by a conical light pipe, which picks up the light below the glass block and conducts it to the face of the photomultiplier tube. The light pipe and the photomultiplier tube are in a container which was chilled by ice water. Between the light pipe and the tube face was a small infra red filter disc. Placing the filter where it cannot become warm has the advantage that it filters out infra-red without reradiating, as it might if it were placed close to the glass block.

In order to check the linearity of response of the dosimeters, a series of irradiations by use of a $Co^{60}$ source were carried out. Distances between the source and the dosimeters and times of exposure were varied to give exposures from 10 mr. to 6.8 r. These have shown the dosimeters to be routinely useful down to 10 mr. with an accuracy of ±5 mR. ±3% of reading.

In order to check the linearity of response with energy, the dosimeters were exposed to radiation from an X-ray source at an effective energy of 100 kev., and at an effective energy of 40 kev. The increased response from 100 kev. effective to 40 kev. effective, as compared to a Victoreen R-meter, is approximately 15%. This is what would be expected from thermoluminescent grade lithium fluoride, so binding the power to the plastic has not caused any degradation of the dosimetric properties of the powder; this is a definite advantage of these dosimeters over any other badge type now in existence.

I claim:
1. A thermoluminescent dosimeter having improved linear response comprising:
   (a) a substrate composed of a polyimide plastic stable to heating to about 400° C. and having a molecular weight above 350,000;
   (b) a thin layer of dosimetric granular lithium fluoride being distributed on at least a portion of the surface of said substrate;
   (c) a binder coating of said polyimide plastic bonding the lithium fluoride granules to said substrate.

2. A dosimeter in accordance with claim 1 wherein said substrate is in the form of a flexible film.

References Cited
UNITED STATES PATENTS
3,243,590   3/1966   Farman et al. _____ 250—83

RALPH G. NILSON, *Primary Examiner.*

MORTON J. FROME, *Assistant Examiner.*

U.S. Cl. X.R.
250—83; 252—301.3